United States Patent
Mouri et al.

(10) Patent No.: US 7,309,676 B2
(45) Date of Patent: Dec. 18, 2007

(54) REMOVER FOR HEAVY METALS CONTAINED IN WATER

(75) Inventors: Motoya Mouri, Osaka (JP); Juichi Yanagi, Osaka (JP)

(73) Assignee: Japan EnviroChemicals, Ltd., Osaka (JP)

( * ) Notice: Subject to any disclaimer, the term of this patent is extended or adjusted under 35 U.S.C. 154(b) by 513 days.

(21) Appl. No.: 10/508,477

(22) PCT Filed: Mar. 19, 2003

(86) PCT No.: PCT/JP03/03400

§ 371 (c)(1), (2), (4) Date: Sep. 21, 2004

(87) PCT Pub. No.: WO03/080518

PCT Pub. Date: Oct. 2, 2003

(65) Prior Publication Data

US 2005/0181931 A1 Aug. 18, 2005

(30) Foreign Application Priority Data

Mar. 22, 2002 (JP) ............................. 2002-080577

(51) Int. Cl.
*C01B 5/00* (2006.01)
*B01J 29/06* (2006.01)
*B01J 29/08* (2006.01)
*C02F 1/28* (2006.01)
*C02F 1/42* (2006.01)

(52) U.S. Cl. ............ 502/60; 502/79; 502/400; 502/407; 502/411; 502/413; 423/580.1; 210/660; 210/679; 210/685

(58) Field of Classification Search ............. 502/60, 502/79, 400, 407, 411, 413; 423/580.1; 210/660, 210/679, 685
See application file for complete search history.

(56) References Cited

U.S. PATENT DOCUMENTS

| | | | | |
|---|---|---|---|---|
| 4,814,152 A | * | 3/1989 | Yan | 423/210 |
| 5,071,587 A | * | 12/1991 | Perman | 252/181 |
| 6,107,354 A | * | 8/2000 | Shaniuk et al. | 521/28 |
| 6,200,483 B1 | * | 3/2001 | Cutler et al. | 210/685 |

FOREIGN PATENT DOCUMENTS

| | | |
|---|---|---|
| JP | 59-193134 | 11/1984 |
| JP | 08-132026 A | 5/1996 |
| JP | 2002-029724 A | 1/2002 |
| JP | 2002-045816 | 2/2002 |

* cited by examiner

*Primary Examiner*—Elizabeth D. Wood
(74) *Attorney, Agent, or Firm*—Wenderoth, Lind & Ponack, L.L.P.

(57) ABSTRACT

A removing agent for heavy metal ion in water which comprises synthetic zeolite, wherein 10 mol % or more of a total amount of exchangeable cation is substituted with magnesium ion and 60 mol % or more thereof is substituted with magnesium ion and calcium ion, and activated carbon at a weight ratio of 2:98 to 50:50 can effectively adsorb and remove heavy metal ions such as lead in water as well as residual chlorine and trihalomethane efficiently, particularly, in tap water, so as to allow delicious and healthful water without disturbing the balance between calcium ion and magnesium ion.

15 Claims, No Drawings

REMOVER FOR HEAVY METALS CONTAINED IN WATER

This application is a U.S. National Stage of International Application No. PCT/JP03/03400 filed Mar. 19, 2003.

TECHNICAL FIELD

The present invention relates to a removing agent for heavy metal in water, and particularly to a removing agent for heavy metal in water, which is packed in a water purifier and removes heavy metal ions such as chromium, manganese, cadmium, lead and mercury ions in tap water, particularly lead, as well as residual chlorine and trihalomethane efficiently, and does not remove calcium ion and magnesium ion but supplements them when the content thereof is low, so as to provide safe water with refreshing taste.

BACKGROUND ART

Activated carbon has been widely utilized for removing trihalomethane and residual chlorine in tap water. In recent years, heavy metal ion such as chromium, manganese, cadmium, lead and mercury dissolved in tap water in very low concentration, particularly lead, have been a problem. However, activated carbon alone has little effect on removing such heavy metal ions.

On the other hand, it has been known that aluminosilicate, typically exemplified by zeolite, exhibits ion exchange function in water and adsorbs heavy metals in water.

It has been hitherto proposed that a mixture of activated carbon and natural zeolite be used for treating tap water (Japanese Unexamined Patent Publication Sho 61-86985); however, natural zeolite has a low performance of removing heavy metals. In addition, many kinds of water purifiers have been proposed in which aluminosilicate-based inorganic ion exchanger (for example, zeolite) and activated carbon are combined (Japanese Unexamined Patent Publications Sho. 61-86985 and Hei. 08-132026); however, zeolite adsorbs not only heavy metals but also calcium ion and magnesium ion in tap water, so that water after being treated with such purifiers does not have so-called refreshing feeling in the throat and is not preferable for health.

Also, a method of mixing calcium (Ca) type zeolite, silver (Ag) type zeolite, hydrogen (H) type zeolite and activated carbon so as to be accommodated in a cartridge (Japanese Unexamined Patent Publication Hei. 06-47383) and a water-quality modifier employing Ca type natural zeolite, Ag type natural zeolite and H type natural zeolite (Japanese Unexamined Patent Publications Hei. 03-229690 and Hei. 07-148487) have been proposed; however, the degree of Ca substitution of Ca type zeolite, the using ratio of various substituted zeolites and the using ratio of them to activated carbon are not described therein, and the mere random mixing of the raw materials is not capable of producing delicious water. Additionally, natural zeolite exhibits low performance for removing heavy metals which does not last for a long period of time.

With regard to the modification of water quality, techniques that use Ca type zeolite to adjust the concentration of calcium ion in water are known; however, techniques that also adjust magnesium ion as the other important mineral component have not been known. In addition, techniques to remove heavy metals in water simultaneously while modifying water quality have not been previously known.

DISCLOSURE OF THE INVENTION

The present invention is intended to provide a removing agent for heavy metal in water, which can highly adsorb and remove particularly lead ion among heavy metal ions such as chromium, manganese, cadmium, lead and mercury in water, particularly, in tap water as well as residual chlorine and trihalomethane, and additionally contains magnesium ion and calcium ion and supplements them in the case where the content thereof is low, so as to allow delicious and healthful water. The object of the present invention is to provide a water-treating agent which can stably retain the pH of water in the vicinity of neutrality after treating water.

The inventors of the present invention have found out that a removing agent for heavy metal in water containing synthetic zeolite, in which 10 mol % or more of the total amount of exchangeable cation is substituted with magnesium ion and 60 mol % or more thereof is substituted with magnesium ion and calcium ion, and activated carbon at a ratio of 2:98 to 50:50 (weight ratio) adsorbs heavy metals such as chromium, manganese, cadmium, lead and mercury, particularly lead, and scarcely adsorbs calcium ion and magnesium ion and additionally elutes calcium ion and magnesium ion so as to be supplemented when they have a certain concentration or less. Also, the inventors of the present invention have known that the concurrent use of this calcium and magnesium type zeolite with activated carbon at a specific ratio allows a superior adsorbent, which does not remove calcium ion and magnesium ion and can efficiently remove residual chlorine and trihalomethane. The inventors of the present invention have, on the basis of this knowledge, further studied and completed the present inventions as follows:

(1) A removing agent for heavy metal ion in water comprising synthetic zeolite, wherein 10 mol % or more of a total amount of exchangeable cation is substituted with magnesium ion and 60 mol % or more thereof is substituted with magnesium ion and calcium ion, and activated carbon at a weight ratio of 2:98 to 50:50.

(2) A removing agent for heavy metal ion in water according to (1), wherein 15 mol % or more of a total amount of exchangeable cation in the synthetic zeolite is substituted with magnesium ion and 75 mol % or more thereof is substituted with magnesium ion and calcium ion.

(3) A removing agent for heavy metal ion in water according to (1), wherein 15 mol % or more of a total amount of exchangeable cation in the synthetic zeolite is substituted with magnesium ion and 90 mol % or more thereof is substituted with magnesium ion and calcium ion.

(4) A removing agent for heavy metal ion in water according to (1), wherein the weight ratio of the synthetic zeolite to the activated carbon is 5:95 to 40:60.

(5) A removing agent for heavy metal ion in water according to (1), wherein the synthetic zeolite is an A type, X type or Y type.

(6) A removing agent for heavy metal ion in water according to (5), wherein the synthetic zeolite is an X type.

(7) A removing agent for heavy metal ion in water according to (1), wherein the synthetic zeolite and the activated carbon each have an average particle size in diameter of 0.01 to 10 mm.

(8) A removing agent for heavy metal ion in water according to (1), wherein the activated carbon has a specific surface area of 400 to 2500 $m^2/g$.

(9) A removing agent for heavy metal ion in water according to (1), wherein the activated carbon bears silver or an inorganic silver compound.

(10) A removing agent for heavy metal ion in water according to (9), further containing a water-soluble alkaline-earth metallic salt.

(11) A removing agent for heavy metal ion in water according to (1), wherein the activated carbon is made of coconut shell.

(12) A removing agent for heavy metal ion in water according to (1), which is a filter material of a water purifier or a water conditioner.

(13) A removing agent for heavy metal in water according to (1), wherein the heavy metal is chromium, manganese, cadmium, lead or mercury.

(14) A removing agent for heavy metal ion in water according to (13), wherein the heavy metal is lead.

Examples of synthetic zeolite before being substituted with magnesium ion and calcium ion to be employed for the present invention include a sodium substitution type of synthetic A type, X type and Y type. These synthetic zeolites are synthesized by a publicly known method and articles on the market are used therefor; examples thereof include the trade names of molecular sieve 3A, 4A and 5A (A types), molecular sieve 13X (X type), and the like, manufactured by KANTO KAGAKU KOGYO K.K.

It is preferable that the A type is 4A type and the X type is 13X type. Among them, the X type is more preferable and 13X type is particularly preferable.

The shape of synthetic zeolite may be powders or crush, a molded body, in which two latter cases the average particle diameter is preferably 0.01 to 10 mm, more preferably 0.05 to 5 mm and most preferably 0.1 to 3 mm. The molded body can be prepared by molding powdery synthetic zeolite with the use of a suitable binder and performing firing, crushing, washing and drying as required. The shapes include spherical, columnar and crushed forms and the crushed form is particularly preferable.

The amount of substitution of magnesium ion in synthetic zeolite is 10 to 100 mol % of the total amount of exchangable cation ($Na_2O$ basis) of synthetic zeolite, preferably 15 to 90 mol %. The amount of substitution of calcium ion is 0 to 90 mol % of the exchangable cation, preferably 10 to 75 mol %. The amount of substitution of calcium ion and magnesium ion in the case where a part of sodium ion is substituted with calcium ion and magnesium ion is denoted at a molar ratio by a value of:

[$CaO+MgO/(Na_2O+CaO+MgO)$]×100

In case where a part of sodium ion is substituted with cation other than calcium ion and magnesium ion, the cation is converted at a molar ratio into $Na_2O$. This value of [$CaO+MgO/(Na_2O+CaO+MgO)$]×100 is usually 60 to 100, preferably 75 to 100 and more preferably 90 to 100.

Synthetic zeolite substituted with magnesium ion, or magnesium ion and calcium ion can be obtained by treating sodium (Na) type synthetic zeolite with water-soluble calcium and water-soluble magnesium, in which case any water-soluble calcium and magnesium is usable if each thereof is dissolved in neutral water at normal temperature by 1 weight % or more (10 g/L).

Methods of obtaining synthetic zeolite substituted with magnesium ion and calcium ion include a method of immersing an Na type synthetic zeolite molded product in an aqueous solution of water-soluble calcium salt and magnesium salt containing each of calcium ion and magnesium ion by two to five times as much as the total amount of exchangable cation of the Na type synthetic zeolite so as to substitute sodium ion with calcium ion and magnesium ion.

Preferable water-soluble magnesium salts include magnesium chloride, magnesium nitrate, magnesium acetate and the like, particularly preferably magnesium chloride. Preferable water-soluble calcium salts include calcium chloride, calcium nitrate, calcium acetate and the like, particularly preferably calcium chloride. Then, sodium ion exchanged with magnesium ion and calcium ion is generally eluted into the aqueous solution.

The immersion may be performed while stirred or standing, and it takes a shorter immersion time while stirred. The time for stirring is typically 60 minutes to 10 hours and the temperature for immersion is preferably approximately 5 to 80° C.

The obtained zeolite exchanged with magnesium ion and calcium ion may be washed as required. The washing may be performed with usual tap water or industrial water.

After being substituted with magnesium ion and calcium ion, draining is performed by a publicly known method, and drying may be performed as required. The drying facilitates the mixing with activated carbon in a subsequent process.

A method of molding the zeolite after being substituted with magnesium ion and calcium ion in a powdery state is also employed; however, washing and drying are rendered more simple and convenient by substituting the molded zeolite with calcium ion and magnesium ion. Magnesium ion and calcium ion may be added during the synthesis of zeolite, which is exchanged with magnesium ion and/or calcium ion. In the case of using the mixture of activated carbon and zeolite, ion exchange may be performed after being mixed.

The mixing of this zeolite exchanged with magnesium ion and calcium ion and activated carbon at a specific ratio allows no removal of minerals and the adsorption of heavy metals, volatile organic chlorine compounds such as residual chlorine and trihalomethane, and musty substances together therewith.

Any raw material is usable for activated carbon to be employed for the present invention such as coconut shell, coal, wood flour and synthetic resin and coconut shell is particularly preferably.

A method of activating carbon is not particularly limited. The activated carbons which can be produced by activation with active gases other than halogen gas such as water vapor, oxygen and carbonic acid gas and with chemical agents such as phosphoric acid and zinc chloride according to the methods described on pp. 23 to 37 (1974) of "Activated Carbon Industries" published by The Heavy Chemical Industries News Agency.

With regard to reactivated activated carbon as one of raw materials, the specific surface area thereof is 400 to 2500 m$^2$/g, preferably 500 to 2000 m$^2$/g and the most preferably 700 to 1800 m$^2$/g.

The average particle size in diameter of activated carbon is not particularly limited; typically 0.01 to 10 mm, preferably 0.05 to 5 mm and most preferably 0.1 to 3 mm.

The weight ratio of activated carbon to synthetic zeolite is typically 98:2 to 50:50, preferably 95:5 to 60:40 and most preferably 90:10 to 70:30.

The shape of activated carbon is powdery, spherical, crushed, columnar forms and the like, preferably crushed. Also, the shape and particle size in diameter of activated carbonate preferably the same as those of zeolite to be mixed.

Silver or an inorganic compound of silver such as silver oxide, silver phosphate, silver nitrate and silver chloride, preferably silver nitrate may be added in order to allow antibacterial properties. Silver is supported on activated carbon to be dried by adding an aqueous solution of a water-soluble silver compound such as silver nitrate thereto. Alternatively, particulates of a water-insoluble silver compound such as silver oxide and metallic silver may be mixed. The content of silver is 0.05 to 2.0 weight % in terms of silver relative to the total weight of zeolite and activated carbon, preferably 0.05 to 0.5 weight % and most preferably 0.05 to 0.3 weight %.

In the case of adding silver, the addition of a water-soluble alkaline-earth metallic salt thereto can control the elution of silver ion into water and maintain the antibacterial effect over a long period. The alkaline-earth metallic salt is preferably magnesium nitrate, calcium nitrate, barium nitrate, magnesium sulfate and the like, more preferably magnesium nitrate. The amount of the water-soluble alkaline-earth metallic salt to be added is 0.05 to 2.0 weight % in terms of alkaline-earth metal relative to the total weight of synthetic zeolite and activated carbon, preferably 0.05 to 0.5 weight % and most preferably 0.05 to 0.3 weight %. Silver and the water-soluble alkaline-earth metallic salt may be added to each of activated carbon and synthetic zeolite before mixing both, to either of activated carbon and synthetic zeolite before mixing both, or to the mixture of activated carbon and synthetic zeolite after mixing both.

Also, a heavy-metal adsorbent of the present invention may be used together with activated carbon fiber, ion-exchange resin, other inorganic adsorbents, oyster shell, coral stone, and the like.

A molded product also is preferably used such that resin, fiber and a binder are added to the present heavy-metal adsorbent to be cylindrically molded (mold carbon), which adsorbent may be molded in a honeycomb state.

An adsorbent of the present invention is filled into a packed vessel and a packed tower such as a column to run general service water and industrial water therethrough, so as to be used for removing diverse deleterious materials in water. The adsorbent is appropriately utilized particularly for a cartridge of a water purifier and a water conditioner beginning with an alkali ion water conditioner. Also, the adsorbent may be used while directly added to water to be treated.

In order to treat tap water at home by using a cartridge packed with the water-treating agent of the present invention, the adsorbent and the amount of water are preferably adjusted so that the space velocity SV of a treating agent of the present invention to treated water is approximately 10 to 4000/hr.

BEST MODE FOR CARRYING OUT THE INVENTION

The present invention is specifically described hereinafter by referring to examples, comparative examples and experiments.

Example 1

A crushed zeolite of 13X type was sieved so as to be evenly made into a particle size in diameter of 0.2 to 0.6 mm (an average particle size in diameter: 0.4 mm). The synthetic zeolite (90 g) was put into a 500-ml beaker to add thereto 180 ml of an aqueous solution of calcium chloride (containing 6.5 g in terms of calcium) and 180 ml of an aqueous solution of magnesium chloride (containing 0.9 g in terms of magnesium), which were stirred by a jar tester at 100 rpm for 60 minutes. After stirring, the synthetic zeolite and the aqueous solution were separated with a sieve of mesh size 0.1 mm, and then the zeolite was washed with tap water and thereafter dried at a temperature of 115° C. to obtain zeolite substituted with calcium ion and magnesium ion (Ca-Mg type zeolite No. 1; degree of calcium substitution is 60 mol %, degree of magnesium substitution is 15 mol %).

Commercial crushed activated carbon from coconut shell having a BET specific surface area of 1100 m$^2$/g was sieved so as to be evenly made into a particle size in diameter of 0.2 to 0.6 mm (an average particle size in diameter: 0.4 mm) and obtain activated carbon No. 1. Ten grams of Ca-Mg type zeolite No. 1 and 90 g of activated carbon No. 1 were uniformly mixed to prepare an adsorbent No. 1.

Example 2

Ca-Mg type zeolite No. 2 (degree of calcium substitution is 60 mol %, degree of magnesium substitution is 33 mol %) was obtained in the same manner as Example 1 except for 500 ml of an aqueous solution containing calcium chloride and magnesium chloride (containing 6.5 g in terms of calcium and 2.0 g in terms of magnesium).

Ten grams of Ca-Mg type zeolite No. 2 and 90 g of activated carbon employed in the above-mentioned Example 1 were mixed well to obtain an adsorbent No. 2.

Example 3

Fifteen grams of Ca-Mg type zeolite No. 2 and 85 g of the activated carbon No. 1 as employed in Example 1 were mixed well to obtain an adsorbent No. 3.

Comparative Example 1

A 13X type zeolite employed in Example 1 was sieved to be evenly made into a particle size in diameter of 0.2 to 0.6 mm, which was regarded as Na-type zeolite, an adsorbent No. 4.

Comparative Example 2

Ten grams of Na-type zeolite prepared in Comparative Example 1 and 90 g of the above-mentioned activated carbon No. 1 having particle size in diameter of 0.2 to 0.6 mm were mixed well, which was regarded as an adsorbent No. 5.

Comparative Example 3

Ca-Type Zeolite

A 13X type crushed zeolite was sieved to have particles in diameter of 0.2 to 0.6 mm (an average particle size in diameter: 0.4 mm). Nineteen grams of the synthetic zeolite was put into a 500-ml beaker to add thereto 360 ml of an aqueous solution of calcium chloride (containing 11 g in terms of calcium), which was stirred in a jar tester at 100 rpm for 60 minutes. After stirring, the synthetic zeolite and the aqueous solution were separated with a sieve having mesh size of 0.1 mm, and then the zeolite was washed with tap water and thereafter dried at a temperature of 115° C. to produce an adsorbent No. 6 consisting of zeolite substituted with calcium ion (degree of calcium substitution is 85 mol %).

Experiment 1

Performance Test of Removing Lead Ion

The performance of removing lead ion with the adsorbents in Examples 1 to 3 and Comparative Examples 1 to 3 was evaluated by the following manner.

Water purifier cartridges having an internal volume of 50 ml were filled with 27 g of each of the adsorbents to perform a flow examination in accordance with JIS S3201.

That is, water containing 50 ppb of lead ion was run through a water purifier at $SV=300 \ hr^{-1}$ at 20° C. so as to regularly collect water at an outlet of the water purifier. The concentration of each component in this water was measured by an atomic absorption spectrometer. The time when the break-through rate of lead exceeds 20% was regarded as break-through time. The longer break-through time evidences the higher performance of removing. On the occasion of this experiment, the pH value of water in 10 minutes after starting to run water through was also measured. The results were shown in Table 1.

Break-through rate(%)={(concentration at outlet)/(concentration at inlet)}×100

Experiment 2

Test for Removing Trihalomethane

The performance of removing trihalomethane of the adsorbents in Examples 1 to 3 and Comparative Example 2 was measured in the following manner.

A water purifier cartridge having an internal volume of 50 ml was filled with 27 g of each of the adsorbents to perform a flow examination according to JIS S3201. The water containing total trihalomethane concentration of 100 ppb (45 ppb of chloroform, 30 ppb of bromodichloromethane, 20 ppb of dibromochloromethane and 5 ppb of bromoform) was run through a water purifier at $SV=300 \ hr^{-}$ at 20° C. and a small amount of water was took out regularly for samples at an outlet of the water purifier. The concentration of each component in this water was measured by ECD gas chromatography. The time when the break-through rate of the total trihalomethane exceeds 20% was regarded as break-through time. The longer break-through time offers the higher performance of the removing agent. The results were shown in Table 1.

TABLE 1

Performance of removing lead and trihalomethane

| | Example 1 | Example 2 | Example 3 | Comparative Example 1 | Comparative Example 2 | Comparative Example 3 |
|---|---|---|---|---|---|---|
| Performance of removing lead (L) | 900 | 890 | 1000 | 8000 | 880 | 8100 |
| Performance of removing trihalomethane (L) | 950 | 960 | 880 | — | 960 | — |
| pH value in 10 minutes after running water through* | 7.8 | 7.7 | 7.8 | 7.9 | 7.7 | 7.9 | pH Value (*pH of the original water = 7.6)

Experiment 3

The Decreasing Rate of Calcium Ion and Magnesium Ion

Calcium ion concentration and magnesium ion concentration at the inlet and outlet were measured in a manner similar to Experiment 1 and the decreasing rate of calcium ion and magnesium ion were calculated. The results were shown in Table 2.

Decreasing rate of calcium ion(%)=[{(concentration at inlet)−(concentration at outlet)}/(concentration at inlet)]×100

Decreasing rate of magnesium ion(%)=[{(concentration at inlet)−(concentration at outlet)}/(concentration at inlet)]×100

TABLE 2

The decreasing rate (%) of calcium ion and magnesium ion in water

| | Time for Running Water Through | Example 1 | Example 2 | Example 3 | Comparative Example 1 | Comparative Example 2 | Comparative Example 3 |
|---|---|---|---|---|---|---|---|
| Ca Decreasing Rate (%) | 5 minutes | 30 | 14 | 33 | 100 | 60 | 40 |
| | 10 minutes | 5 | 2 | 8 | 100 | 30 | 12 |
| | 60 minutes | 0 | 0 | 1 | 60 | 8 | 4 |
| | 120 minutes | 0 | 0 | 0 | 20 | 3 | 0 |
| Mg Decreasing Rate (%) | 5 minutes | 18 | 5 | 6 | 100 | 80 | 35 |
| | 10 minutes | 2 | 1 | 2 | 100 | 30 | 10 |
| | 60 minutes | 0 | 0 | 0 | 80 | 10 | 3 |
| | 120 minutes | 0 | 0 | 0 | 30 | 5 | 0 |

Comparative Example 4

In 50 ml of distilled water, 0.157 g of silver nitrate (0.1 g in terms of silver) was dissolved. The solution was uniformly sprayed on 100 g of the adsorbent No. 1 and thereafter the composition was dried to obtain an adsorbent No. 7.

Comparative Example 5

In 50 ml of distilled water, 0.157 g of silver nitrate (0.1 g in terms of silver) and 1.25 g of magnesium nitrate $Mg(NO_3)_2 \cdot 6H_2O$ (0.12 g in terms of magnesium) were dissolved. The solution was uniformly sprayed on 100 g of the adsorbent No. 1. Thereafter the composition was dried to obtain an adsorbent No. 8.

Experiment 4

The Measurement of Silver Elution Quantity 2.0 g of each of the adsorbents No. 6 to 8 was put into a 200-ml conical flask to add 100 ml of distilled water thereto, which was shaken at a temperature of 25° C. for 1 hour and filtered. Concentration of silver ion in the filtrate was measured by an atomic absorption spectrophotometer. The results were shown in Table 3. The performance of removing lead and the performance of removing trihalomethane of the adsorbents No. 6 to 8 were the same as those of the adsorbent No. 3.

TABLE 3

Silver elution quantity

| | No. 6 | No. 7 | No. 8 |
|---|---|---|---|
| Silver Concentration (μg/L) | 0 | 34 | 21 |

Experiment 5

The sensory test in drinking water of Ca type zeolite and Ca-Ma type zeolite, namely, the sensory test of tap water treated by water purifiers loaded with the adsorbents shown in Table 4 was performed in accordance with an analysis method of taste prescribed by tap water test method (2001) edited by Japan Water Works Association. That is, tap water was run at 300 L/hr through a water purifier cartridge prepared by a process in Experiment Example 1 so as to gather treated water in 10 minutes after starting to run water through, which treated water was heated up to a temperature of 40° C. Five panelists kept approximately 10 ml of the water in their mouths to evaluate taste thereof in contrast with tap water. The results of total evaluation points by five panelists on the following criterion for evaluation were shown in Table 5.

TABLE 4

Results for sensory test (zeolite/activated carbon = 20/80)

| | Mg | Ca | Mg + Ca | Total Points |
|---|---|---|---|---|
| Comparative Example 1 | 5 | 60 | 65 | −1 |
| Comparative Example 2 | 5 | 70 | 75 | −1 |
| Example 1 | 15 | 60 | 75 | 3 |
| Example 2 | 33 | 60 | 93 | 4 |
| Example 3 | 34 | 52 | 86 | 4 |
| Example 4 | 15 | 64 | 79 | 3 |
| Example 5 | 15 | 53 | 68 | 3 |
| Comparative Example 3 | 0 | 90 | 90 | −3 |
| Comparative Example 4 | 0 | 98 | 98 | −4 |

The Criterion for Evaluation

More tasteless than tap water: −1 point

Indistinguishable from tap water: 0 point

More delicious than tap water: 1 point

From the above results, it has been found that delicious drinking water can be obtained by not merely calcium ion contained therein but also balance between calcium ion and magnesium ion.

INDUSTRIAL APPLICABILITY

A removing agent for heavy metal in water of the present invention can highly adsorb and remove heavy metal ions such as lead in water, particularly, in tap water as well as residual chlorine and trihalomethane efficiently. Delicious drinking water is obtained by not merely calcium ion contained therein but also balance between calcium ion and magnesium ion, and a removing agent for heavy metal in water of the present invention does not remove calcium ion and magnesium ion contained in water and supplements them for retaining the balance thereof in the case where the content thereof is low, so as to allow delicious and safe water for health. A removing agent for heavy metal in water of the present invention can stably retain the pH of water in the vicinity of neutrality also after treating the removal of heavy metal and therefore allow water appropriate for favorite beverages such as tea and coffee.

The invention claimed is:

1. A removing agent for heavy metal ion in water comprising synthetic zeolite, wherein 10 mol % or more of a total amount of exchangeable cation is substituted with magnesium ion and 60 mol % or more thereof is substituted with magnesium ion and calcium ion, and activated carbon at a weight ratio of 2:98 to 50:50.

2. A removing agent for heavy metal ion in water according to claim 1, wherein 15 mol % or more of a total amount of exchangeable cation in the synthetic zeolite is substituted with magnesium ion and 75 mol % or more thereof is substituted with magnesium ion and calcium ion.

3. A removing agent for heavy metal ion in water according to claim 1, wherein 15 mol % or more of a total amount of exchangeable cation in the synthetic zeolite is substituted with magnesium ion and 90 mol % or more thereof is substituted with magnesium ion and calcium ion.

4. A removing agent for heavy metal ion in water according to claim 1, wherein the weight ratio of the synthetic zeolite to the activated carbon is 5:95 to 40:60.

5. A removing agent for heavy metal ion in water according to claim 1, wherein the synthetic zeolite is an A type, X type or Y type.

6. A removing agent for heavy metal ion in water according to claim 5, wherein the synthetic zeolite is an X type.

7. A removing agent for heavy metal ion in water according to claim 1, wherein the synthetic zeolite and the activated carbon each have an average particle size in diameter of 0.01 to 10 mm.

8. A removing agent for heavy metal ion in water according to claim 1, wherein the activated carbon has a specific surface area of 400 to 2500 $m^2/g$.

9. A removing agent for heavy metal ion in water according to claim 1, wherein the activated carbon bears silver or an inorganic silver compound.

10. A removing agent for heavy metal ion in water according to claim 9, further containing a water-soluble alkaline-earth metallic salt.

11. A removing agent for heavy metal ion in water according to claim 1, wherein the activated carbon is made of coconut shell.

12. A removing agent for heavy metal ion in water according to claim 1, which is a filter material of a water purifier or a water conditioner.

13. A method for removing heavy metal ion in water, comprising contacting the heavy metal ion in water with the removing agent according to claim 1.

14. The method for removing heavy metal ion in water according to claim 13, wherein the heavy metal ion is chromium, manganese cadmium, lead or mercury.

15. The method for removing heavy metal ion in water according to claim 14, wherein the heavy metal ion is lead.

* * * * *